United States Patent [19]

Hara

[11] Patent Number: 4,928,827
[45] Date of Patent: May 29, 1990

[54] LIGHT-TIGHT CASSETTE

[75] Inventor: Yoshio Hara, Kanagawa, Japan

[73] Assignee: Fuji Photo Film Co., Ltd., Ashigara, Japan

[21] Appl. No.: 188,432

[22] Filed: Apr. 29, 1988

[30] Foreign Application Priority Data

May 1, 1987 [JP] Japan ............................. 62-65306[U]
Jun. 24, 1987 [JP] Japan ............................. 62-95901[U]

[51] Int. Cl.⁵ ............................................. B65D 85/67
[52] U.S. Cl. .................................... 206/416; 206/407;
206/413; 206/414; 206/415; 242/71.1
[58] Field of Search ............... 206/316, 407, 413, 414,
206/415, 416; 242/55.53, 71.1

[56] References Cited

U.S. PATENT DOCUMENTS

| 4,148,395 | 4/1979 | Syracuse et al. | 206/414 |
| 4,179,028 | 12/1979 | Stemme et al. | 206/316 |
| 4,244,254 | 1/1981 | Fish | 206/407 |
| 4,272,035 | 6/1981 | Sherman et al. | 242/71.1 |
| 4,597,658 | 7/1986 | Buelens et al. | 242/71.1 |
| 4,671,409 | 6/1987 | Espy | 206/407 |
| 4,787,513 | 11/1988 | Auble et al. | 206/407 |

FOREIGN PATENT DOCUMENTS 888860 2/1962 United Kingdom ................ 206/415

*Primary Examiner*—David T. Fidei
*Attorney, Agent, or Firm*—Burns, Doane, Swecker & Mathis

[57] ABSTRACT

A light-tight cassette for a roll of light-sensitive photographic material, which may be readily assembled, and is constituted by a tubular body portion and molded end caps. The end caps have uniformly spaced outer and interior flanges forming a channel engaging the end margins of said body portion, said outer flange having along its corner portions extensions which have an axial dimension exceeding the axial dimension of the interior flange. The interfitting relationships between ensure maximum effectiveness in protecting light tightness.

1 Claim, 5 Drawing Sheets

LIGHT-TIGHT CASSETTE

BACKGROUND OF THE INVENTION

1. Field of the Invention

The present invention provides a light-tight cassette for holding a roll of photosensitive material. Examples of such material would be a roll of printing paper and a roll of photographic film. The cassette particularly is adaptable for use as it is provided with a pull tab arrangement at an opening of the cassette for loading the photosensitive material under sunlight or indoor illumination.

2. Description of the Prior Art

Various types of packages for photosensitive materials have been disclosed. Examples of these disclosures are Japanese Utility Model Unexamined Published Application (hereinafter referred to as "OPI") No. 88980/80; Japanese Utility Model Application No. 16608/81; Japanese Patent Application (OPI) No. 124140/80; Japanese Patent Application (OPI) No. 128333/82; U.S. Pat. Ser. No. 4,068,247; Japanese Patent Application (OPI) No. 156058/85; U.S. Pat. Ser. No. 4,148,395; U.S. Pat. Ser. No. 4,179,028 and U.S. Pat. Ser. No. 4,272,035.

FIG. 5 shows a light-tight cassette as disclosed in U.S. Pat. Ser. No. 4,068,247. Therein, a cassette 10 for holding a roll of a light-sensitive photographic material comprises a tubular body portion 1 and two end caps IA and IB. The web 3 of photographic material is pulled out of the roll through a slot-like opening 2 which extends between the two end caps. In the figure, the photographic material has been illustrated as being transparent. The slot 2 is provided with a construction of any well known type, for example, such as disclosed by U.S. Pat. Ser. No. 4,568,590 (hereinafter incorporated by reference) for preventing light from reaching the photosensitive web 3 in the cassette 10. The tubular body 1 is usually manufactured from a material such as plastic and/or cardboard. The tubular body 1 may be manufactured by an extrusion process or manufactured by bending a plastic sheet or a cardboard sheet into the appropriate shape.

The end caps may be made of a polyolefin such as polypropylene and polyethylene or polystyrene. During molding operations of the end caps, the ratio of contraction of the polyolefins, such as polypropylene and polyethylene, may be quite large. A frame which is part of the end cap extends along the total circumference or perimeter thereof and is subject to possible inward warpage when the end cap is formed as a rectangle by injection molding. This can cause problems of light leakage into the cassette when the end caps are assembled to the tubular body and which would then adversely effect the photosensitive material contained therein. Further, as previously discussed, due to the inward warps of the end caps, the accuracy and efficiency of the assembly of the containers is also adversely affected. For that reason, cassettes may be improperly assembled which could cause damage to the photosensitive material.

The cassettes identified in the foregoing prior art have a drawback in that it is difficult to make the bend or crease lines of the plastic sheet material or cardboard sheet material completely straight during the manufacturing process which transforms the plastic sheets or cardboard sheets into the tubular body forming the cassettes. The bending process of the plastic or cardboard sheets is predisposed to provide a tubular, polygonal body that is slightly rounded in form. When a photosensitive web is then subsequently packaged in the tubular body having the slightly rounded cross-section, it is difficult to fit the end caps to both ends of the body in order to seal off the photosensitive material from exposure to light. This is particularly true as the end caps may be fitted to both ends of the tubular body while in a darkroom as would be required to provide a complete cassette. Accordingly, the accuracy and efficiency of assembly-line work for manufacturing the cassette is significantly affected and, as a result, a large number of improperly assembled unfinished cassettes are likely to be manufactured.

In order to overcome the foregoing deficiencies of prior art photosensitive material cassettes, the present invention provides a container in which the end caps, serving to close the open ends of the substantially polygonal cross-section tubular body are provided with a unique construction. This construction provides the end caps with outer and inner frames extending along the total circumference of the end openings of the tubular body. The outer and inner frames are located at a substantially uniform distance from each other so that a groove is defined between the outer and inner frames. Edges of the corresponding open ends of the tubular body are engaged in the groove. When the end caps are in position to close off the corresponding ends of the tubular body, light is blocked from entering into the cassette. The outer frame of the end cap is provided with corner portions which project, toward the longitudinal direction of the tubular body to a greater extent than corner portions of the inner frame. Additionally, a corner portion of the outer frame is trimmed to a partial extent so that it will not contact and thus interfere with the photosensitive web that will be withdrawn through the outlet opening of the tubular body.

In order to overcome the problems associated with the foregoing discussions, one object of the present invention is to provide end caps for photosensitive material cassettes in which the end caps are made from polyolefins such a polypropylene and polyethylene or polystyrene. In order to facilitate assembly and prevent warpage of the end caps made from this material, the caps are provided with an outer frame and an inner frame and a plurality of ribs provided at regular intervals therebetween. The ribs or projections engage in notches provided in the tubular body.

Accordingly, it is an object of the present invention to solve the above-discussed drawbacks by providing a photosensitive material web cassette in which the positioning of end caps, to the tubular body, is simplified and permits the end caps to be assembled to the tubular body in an efficient manner, even when the assembly takes place in a darkroom.

DETAILED DESCRIPTION OF A PREFERRED EMBODIMENT

Figure 1:
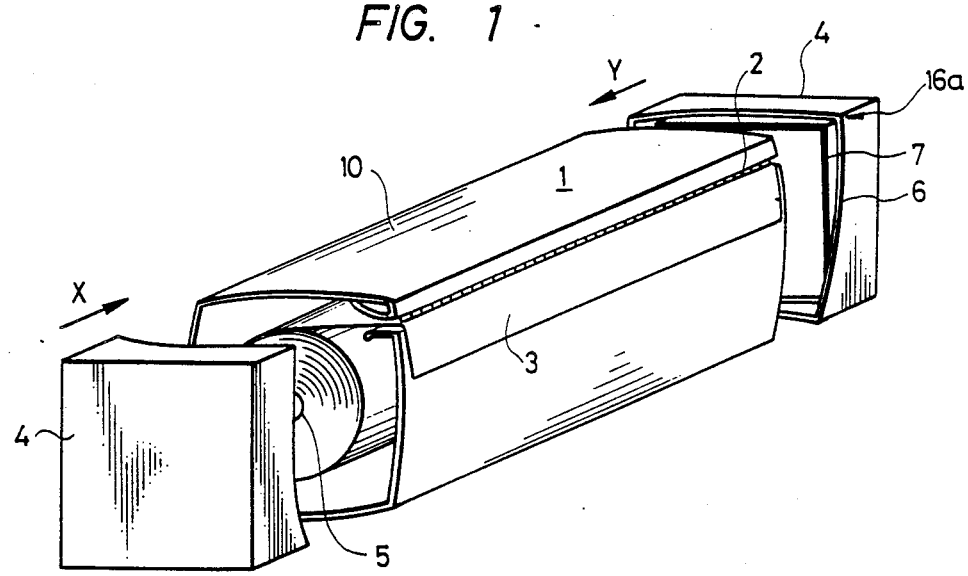
FIG. 1 is a perspective exploded view of a photosensitive web cassette.

FIG. 1 shows a photosensitive web material cassette 10. As shown in FIG. 1, a roll of a photosensitive web 3 is provided as being wound on a core element 5 and positioned in the tubular body 1. The tubular body 1 is provided as being open an both ends and has an opening or slit 2 adjacent a top edge and extending the length of the body. The opening 2 then permits the photosensitive web 3 to pass therethrough as it is unwound from the core element 5. The opening 2 has an arrangement for blocking light from reaching the photosensitive web. Two end caps 4 are provided for closing the open ends of the tubular body 1.

Figure 2:
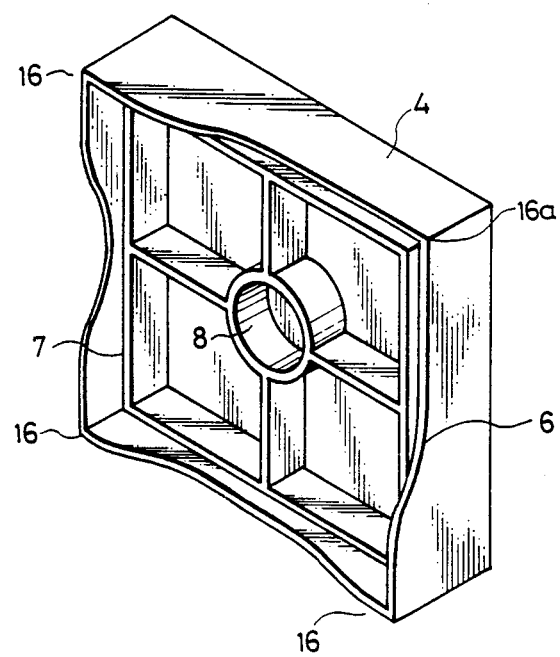
FIG. 2 is a perspective view of an end cap of the photosensitive web cassette.

As shown in FIG. 2, the end cap 4 has an outer frame 6 and an inner frame 7 which extend around the circumference or perimeter of the end cap and are positioned at a substantially uniform distance from each other so that a groove, in which the edges of the corresponding ends of the tubular body are engaged, is defined between the outer and inner frames. When the end caps 4 are positioned on the tubular body 1, the open ends of the tubular body are closed so as to prevent light from entering into the tubular body and thereby damaging the photosensitive web. The outer frame 6 of the end cap 4 is provided with corner projections 16. Three such corners are shown in FIG. 2. The corner projections 16 extend in the direction of the tubular body 1 to an extent greater than the inner frame 7. As shown in FIG. 1, the corners 16 extend in the direction indicated by the arrows X and Y (only the arrow Y being referenced hereinafter). The remaining corner portion 16A of the outer frame 6 of the end cap 4 is partially cut away so that the photosensitive web 3 can be withdrawn from the opening 2 from the tubular body. Additionally, each end cap 4 is provided with a hub portion 8 which supports the core 5.

Figure 3:
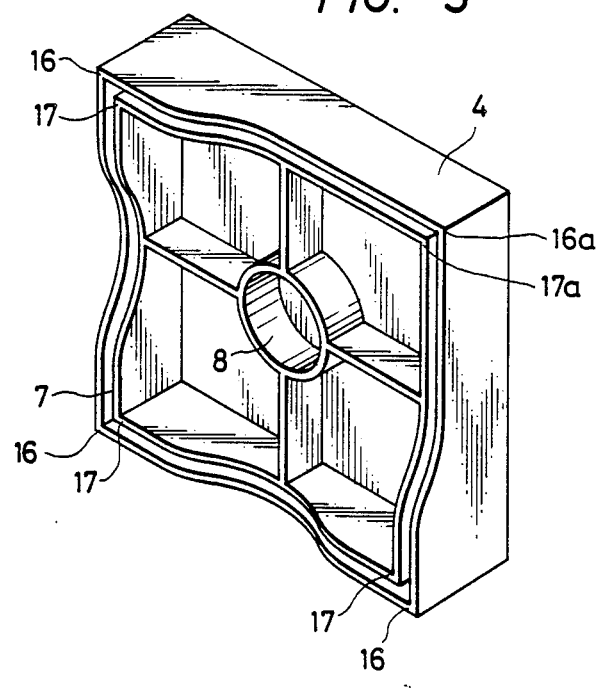
FIG. 3 is a perspective view of a further embodiment of the end cap of FIG. 2.

FIG. 3 is a view of a further embodiment of the end cap 4 in which the inner frame 7 has corner projections 17, at three corners thereof, which project toward the tubular body 1 in the direction of the arrow Y to an extent greater than the inner corner arrangements shown in FIG. 2. Due to the greater extent of projection of the inner frame 17, in this embodiment, the remaining corner indicated at reference numeral 17A is partially cut away so as to again permit the photosensitive web 3 to be withdrawn from the opening 2 without interference with the end caps.

The inner frame 7 is provided with edges, along three sides thereof, which undulate from depressed areas adjacent the central portion of the frame to more pronounced peak areas along the corners indicated at reference numerals 17.

Figure 4:
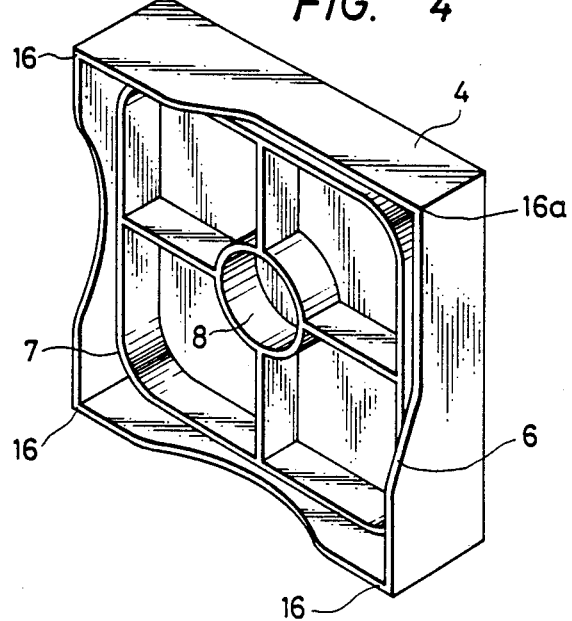
FIG. 4 is a perspective view of a further embodiment of the end cap of a photosensitive web cassette.
Figure 5:
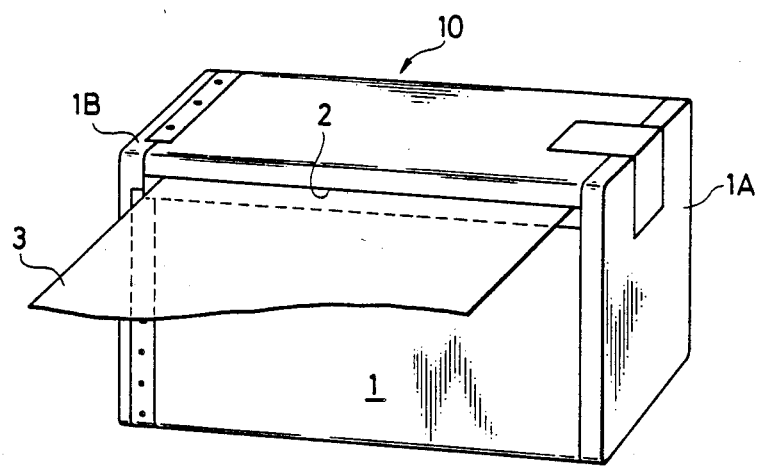
FIG. 5 is a perspective view of a conventional photosensitive web cassette.

FIG. 4 is another embodiment of the end cap 4 in which the edges of the outer frame 6 extend in the direction of the arrow Y to a greater extent toward the tubular body 1 than does the inner frame 7. The outer frame 6 is, in a manner similar to that of FIG. 3, provided with undulating portions which permit the corners 16 to extend in the direction of the arrow Y a greater extent than side portions of the outer frame. Further, the inner frame 7 is provided with rounded corners so as to provide for a groove between the inner and outer frames which is of a greater extent than that of the embodiments of FIGS. 2 and 3. As the groove is widened due to the rounded corners of inner frame 7, it is easier to attach the end cap 4 to the tubular body 1.

Figure 6:
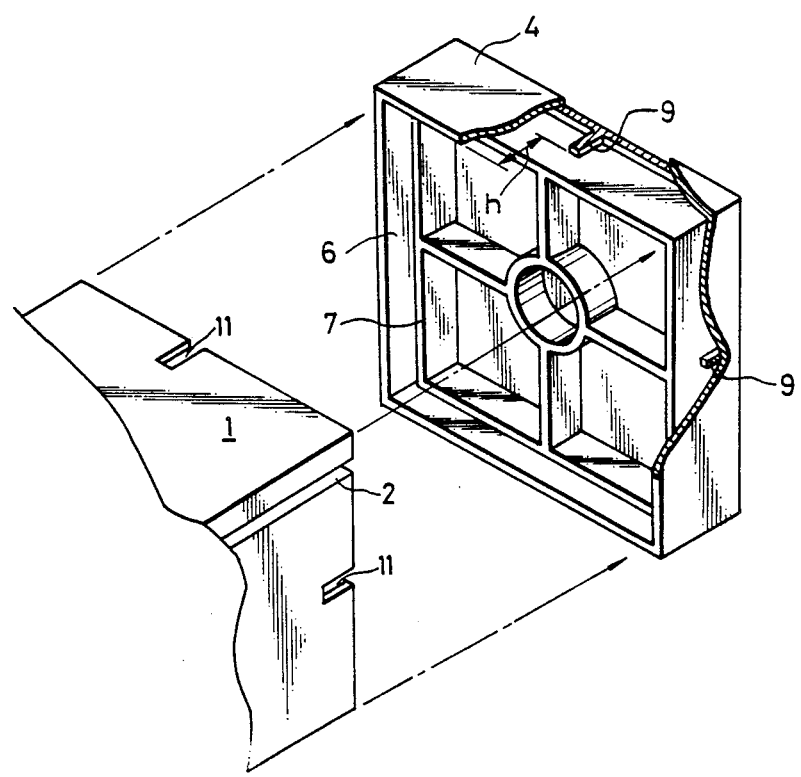
FIG. 6 is a exploded view, in perspective, of a further embodiment of the tubular body and end cap arrangement.

FIG. 6 is another embodiment of the container for a photosensitive web in which the ends of the tubular body 1 are provided with notches or grooves 11 which receive ribs or projections 9 provided in the end cap 4. Therein, the end cap 4 has an outer frame 6 and an inner frame 7 as in the previous embodiments. These frames extend along the circumference or perimeter of the end cap and are positioned at a substantially uniform distance from each other so as to provide a groove which receives the open end edge portions of the tubular body 1. The edge portions seat in the groove. Each end cap is of a substantially rectangular shape and is provided with the ribs or projections 9 at substantially the center of the respective sides of the engaging groove. The engagement of the ribs 9 in the notches 11 ensure that the cap 4 is securely engaged with a tubular body 1.

Figure 7:
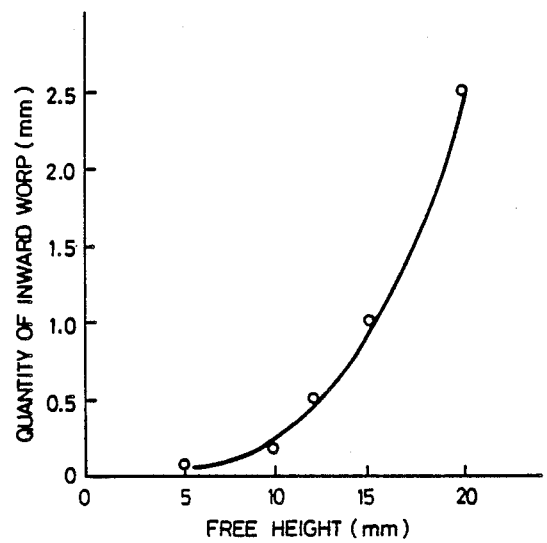
FIG. 7 is a graph indicating the relationship between the free height of a rib of the end cap and the quantity of the inward warp of the outer frame of the end cap; and, FIG. 8 is a front view of an end cap according to another embodiment of the device.

Comparisons were made to the degree of inward warp of the central part of the end cap 4 at a central part of the end cap, i.e., the portion of the end cap having the rib or projection 9. The quantity of inward warp was measured as the size of the rib or projection 9 varied. In the graph shown in FIG. 7, the end cap 4 was shaped as a square with the length of each side being 120 millimeters. The depth and width of the engaging groove between the outer and inner frames 6 and 7 was 20 millimeters and 3 millimeters, respectively. The frames 6 and 7 each had a thickness of 1.2 millimeters while the width of the rib or projection 9 was 1.2 millimeters. The distance "H" between the inner end of the outer frame and the tip of the rib was determined to be the free height. Based on the measurements resulting therefrom, the inward warp of the outer frame 7 was effectively suppressed when the rib or projection 9 was set so as to have a free height of 15 millimeters or less. Additionally, the amount of overlap of the tubular body 1 and the end cap 4, at the time of the insertion of the end of the tubular body into the engaging groove, was required to be 3 millimeters or more and preferably 5 millimeters or more so as to effectively secure the light blocking properties of the container.

Figure 8:
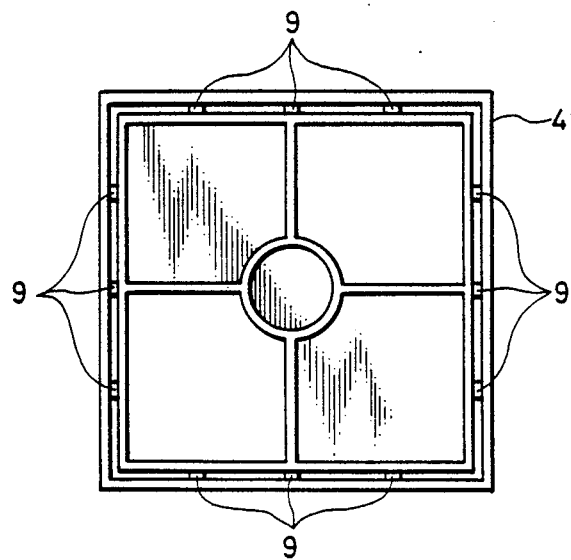

As shown in FIG. 8, a plurality of ribs or projections 9 may be provided along each side of the end cap 4 between the outer and inner frames 6 and 7, respectively. The increased number of the ribs or projections 9 provide for more effective suppression of the inward warp of the end cap.

Although the notches 11, corresponding to the ribs 9, are provided in the end of the tubular body 1 in the above-described embodiment, the present device is not confined thereto but may be otherwise arranged so that the notches are not present, as in the embodiment of FIGS. 1 through 4. The end cap 4, while being shown as substantially rectangular in the embodiment of FIG. 1, the present device also contemplates that the end cap 4 may be otherwise shaped.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A light-tight cassette for holding a roll of light sensitive material and which includes a tubular body of polygonal cross-section; said body being open at each end thereof and having a slot adjacent to an edge of said body and extending along said body so as to provide an outlet opening through which said material passes; said slot provided with a construction for keeping light from reaching said material in said container through said slot; and, end cap means for closing said each end of said body comprising, an outer frame and an inner frame for said end cap means, said frames extending circumferentially of said cap means, said frames positioned at a substantially uniform distance from each other so that a groove is defined between said outer and inner frames with said each end of the body being received in said groove; and, a plurality of ribs being provided at regular intervals in said groove, wherein the open ends of the tubular body are provided with notches for receiving the ribs when the end caps are positioned to cover said each end of said body.

* * * * *